Aug. 1, 1950 — H. C. KARCHER ET AL — 2,517,114

VALVE SEAT INSERT

Filed Aug. 28, 1947

Inventors
Harry C. Karcher &
Dimitrius Geedan
By Spencer, Willit, Helwig, Baillio
Attorneys Patented Aug. 1, 1950

2,517,114

UNITED STATES PATENT OFFICE 2,517,114

VALVE SEAT INSERT

Harry C. Karcher and Dimitrius Gerdan, Indianapolis, Ind., assignors to General Motors Corporation, Detroit, Mich., a corporation of Delaware Application August 28, 1947, Serial No. 770,990

7 Claims. (Cl. 123—188)

The present invention generally relates to valve mechanisms and more particularly to valve seat inserts.

The principal object of the invention is to provide a valve insert having spaced surfaces for tight engagement with the surface of a high temperature gas passage in a valve body of an engine and a relieved intermediate surface provided with a low melting point coating to provide clearance between the coating and the passage surface and thereby prevent distortion of the insert upon expansion and contraction of the body due to differences in engine operating temperature, the high temperature gas passing through the passage and the valve seat insert causing melting of the coating of the insert to insure efficient transfer of heat between the insert and the valve body.

The means by which this object is accomplished will become apparent by reference to the following detailed description of and drawing illustrating these means.

Figure 1:
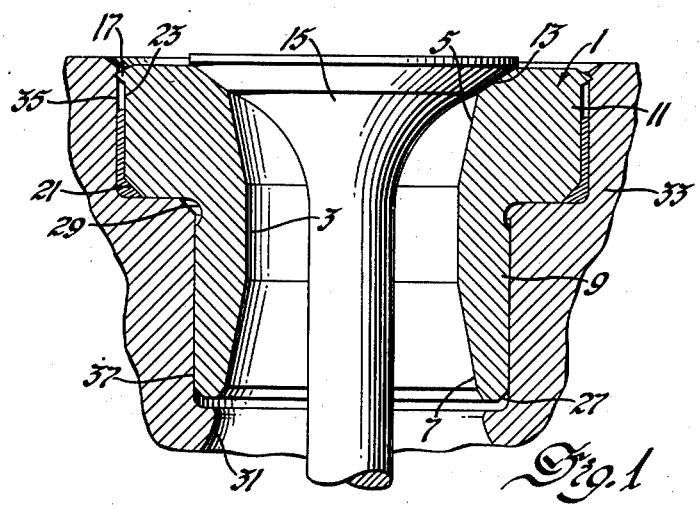
Figure 1 is a sectional view of a portion of a valve body and a valve seat insert in a passage of the body and a poppet valve seated thereon.
Figure 2:
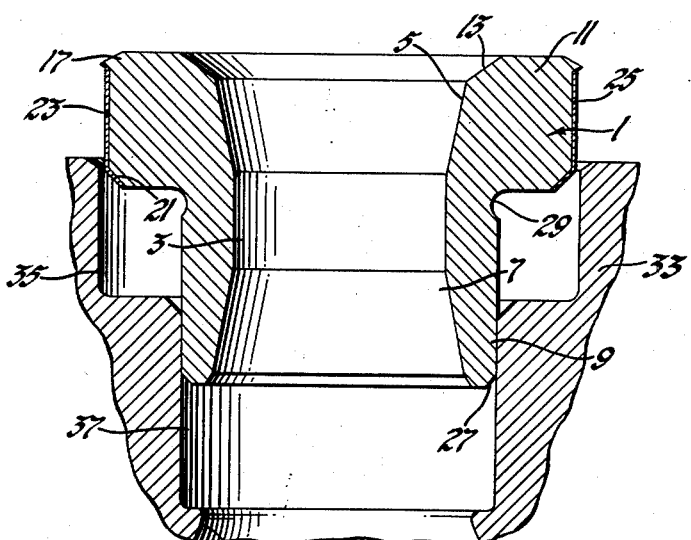
Figure 2 is a view similar to Figure 1 illustrating the method by which the valve seat insert is secured in the valve body passage.
Figure 3:
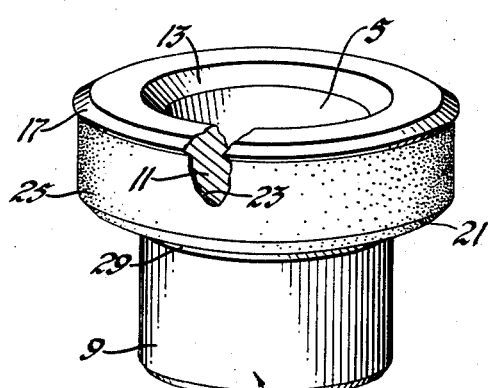
Figure 3 is a perspective view of the valve seat insert shown in Figures 1 and 2 with parts broken away and in section to show the novel details thereof.

As shown in the drawings the valve seat insert, generally indicated at 1, is of annular form and is provided with a longitudinal bore 3 with outwardly tapered end portions 5—7, a shank portion 9 adjacent one end, of small outside diameter, and a flange portion 11 adjacent the other end of larger outside diameter. The outer end face of the flange portion 11 is provided with a tapered annular valve seat portion 13, on which a poppet valve 15 is shown seated in Figure 1. A V-shaped peripheral projection or flange 17 is provided on the flange portion 11 adjacent the outer end face and a tapered annular peripheral surface 21 is provided on the inner end face of the flange portion 11. As seen in Figures 2 and 3 the tapered surface 21 and the outer cylindrical surface 23 of the flange portion 11 adjacent the V-shaped projection or flange 17 is coated with a low melting point metallic coating 25 which is adapted to melt at normal operating temperature of the valve insert. The outer end of the shank portion is provided with an external tapered surface 27 and an external groove 29 is provided thereon adjacent the inner end face of the flange portion 11.

The above described valve insert 1 is tightly secured in a passage 31 in an engine cylinder head or block or a valve body 33 having counterbores 35—37 adjacent one end of the passage 31 of dimensions such that upon heating and expansion of the valve body and/or cooling and contraction of the valve insert from a given temperature the V-shaped projection or flange 17 may be pressed into the larger counterbore 35 of the passage 31 and the shank portion 9 may be pressed into the smaller counterbore and the face of the flanged portion 11 of the valve seat insert is tightly seated on the face of the valve body between the counterbores. Upon the return of the valve body and insert to this given temperature the V-shaped projection or flange 17 and shank 9 of the insert will be in tight engagement with the internal surfaces of the body counterbores 35—37 and clearance will be left between the coated surface of the insert and the counterbore 35.

For normal operating temperatures of the valve insert and body the low melting point coating 25 of the insert will melt and partially fill the clearance space between the insert and body and the V-shaped projection 17 and shank portion 9 will remain in tight engagement with the internal surfaces of the counterbores 35—37 of the valve body 33 to prevent escape of this molten coating which serves as an efficient heat transferring medium in the clearance space between the insert and body, which space prevents distortion of the valve seat insert by relative expansion and contraction of the valve body.

The above described valve construction is particularly adapted to internal combustion engines to prevent overheating and distortion of the exhaust valve seats and to prolong the life thereof.

We claim:

1. A valve seat insert for an internal combustion engine having spaced end portions and a relieved portion therebetween coated with a material which melts at normal engine operating temperatures of the valve seat insert to provide a fluid heat transferring film.

2. An annular valve seat insert for an internal combustion engine having spaced external end portions and a relieved exterior surface therebetween having a coating adapted to melt at normal engine operating temperatures of the valve seat insert to provide a fluid heat transferring medium.

3. An annular valve seat insert for an internal combustion engine having a seat on one end, a narrow external end portion adjacent said seat, an indirect external portion having a coating which melts at normal engine operating temperature of the valve seat insert between the external flange and the opposite end portion of said valve insert.

4. An annular valve seat insert for an internal combustion engine having large and small outside diameter portions at opposite ends, said large diameter end portion having a narrow external flange portion adjacent the outer end face and a coating thereon adapted to melt at normal engine operating temperature of the valve insert.

5. An annular valve seat insert for an internal combustion engine having large and small outside diameter portions adjacent the opposite end faces, said large diameter portion having a seating surface on the outer end face and a narrow V-shaped external flange adjacent the outer end face and a coating on the remaining portion of the exterior of said large diameter portion adapted to melt at normal engine operating temperature of the valve insert and serve as a fluid heat transferring medium.

6. A valve mechanism for an internal combustion engine including a valve body having a passage therein and a valve seat insert having spaced portions adjacent the ends for engagement with the wall of the passage in the valve body and an intermediate portion spaced from the passage wall coated with a material adapted to melt and provide a fluid heat conducting film between the insert and the wall of the valve body passage and allow relative expansion and contraction therebetween.

7. A valve mechanism for an internal combustion engine including a valve body having a passage provided with counterbored portions, a valve seat insert having spaced external portions in tight engagement with the walls of the counterbored portions of the passage in the body, an annular surface seated on the surface of the body between the counterbored portions, and a coated external surface spaced from one of the internal surfaces of the valve seat insert between the seating and one pair of engaging surfaces, the coating of said spaced surface being adapted to melt for normal engine operating temperatures of the body and valve seat insert for providing an efficient fluid heat transferring film between the body and the valve seat insert and for allowing relative expansion and contraction therebetween.

HARRY C. KARCHER.
DIMITRIUS GERDAN.

No references cited.